United States Patent [19]

Bernier et al.

[11] Patent Number: 4,958,006
[45] Date of Patent: Sep. 18, 1990

[54] FLUIDIZED BED PRODUCT DISCHARGE PROCESS

[75] Inventors: Robert J. Bernier, Flemington; Jorge O. Bühler-Vidal, North Brunswick; Urho S. Haapala, Middlesex; Benjamin R. Rozenblat, Old Bridge, all of N.J.

[73] Assignee: Union Carbide Chemicals and Plastics Inc., Danbury, Conn.

[21] Appl. No.: 213,095

[22] Filed: Jun. 28, 1988

[51] Int. Cl.$^5$ .............................................. C08F 6/02
[52] U.S. Cl. ................................... 528/501; 528/487;
528/490; 528/495; 528/499; 524/151; 524/291;
524/432; 524/579; 526/348.6; 526/901;
526/920; 159/2.2; 159/25.1; 159/DIG. 16;
203/91; 203/92
[58] Field of Search ............... 528/499, 501, 502, 487,
528/490, 495; 422/131, 145, 135; 526/901, 920,
348.6; 264/DIG. 78; 203/91, 92; 524/151, 291,
432; 159/2.2, 25.1

[56] References Cited

U.S. PATENT DOCUMENTS

| Re. 23,948 | 2/1955 | Fuller | 264/DIG. 78 |
|---|---|---|---|
| 3,023,203 | 2/1962 | Dye | 526/901 X |
| 3,440,238 | 4/1969 | Foglia et al. | 526/901 X |
| 3,925,341 | 12/1975 | Mueller-Tamm et al. | 528/502 X |
| 4,288,407 | 9/1981 | Markel et al. | 422/145 X |

OTHER PUBLICATIONS

Update on Continuous Compounding Equipment Pt. II: Twin-screw and Specialized Compounders, Collins, Plastics Compounding 11/12, 1982.

Primary Examiner—Joseph L. Schofer
Assistant Examiner—F. M. Teskin
Attorney, Agent, or Firm—Clement J. Vicari

[57] ABSTRACT

Method and apparatus for the post reaction treatment of resins produced by fluidized bed polymerization of alpha olefins wherein an extruder is coupled in communication with the reactor and all necessary devolatilization of monomer, deactivation of catalysts and addition of additives are performed in the extruder.

12 Claims, 5 Drawing Sheets

FLUIDIZED BED PRODUCT DISCHARGE PROCESS

BACKGROUND OF THE INVENTION

1. Field of the Invention

The present invention relates to a fluidized bed product discharqe process and, more particularly to a process for the post reaction treatment of resins produced in gas phase reactors.

2. Description of the Prior Art

The introduction of high activity Ziegler-Natta catalyst systems has lead to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefins polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions.

Unfortunately, the versatility of the resin post-reaction treatment process has not evolved at the pace of the gas phase reactor technology which has been extended to the production of fluidizable but non-free flowing solid polymer as disclosed in U.S. Pat. No. 4,710,538 issued Dec. 1, 1987. These non-free flowing granular resins are referred to sometimes as "sticky polymers" because of their tendency to aggregate in larger particles and to eventually form large chunks of solid polymer.

The term "sticky polymer" is defined as a polymer, which, although particulate at temperatures below the sticking temperature, agglomerates at temperatures above the sticking temperature. The term "sticking temperature", which, in the context of this specification, concerns the sticking temperature of particles of polymer in a fluidized bed, is defined as the temperature at which fluidization ceases due to the agglomeration of particles in the bed. The agglomeration may be spontaneous or occur on short periods of settling.

A polymer may be inherently sticky due to its chemical or mechanical properties or pass through a sticky phase during the production cycle. Sticky polymers are also referred to as non-free flowing polymers because of their tendency to compact into aggregates of much larger size than the original particles and not flow out of the relatively small openings in the bottom of product discharge tanks or purge bins. Polymers of this type show acceptable fluidity in a gas phase fluidized bed reactor; however, once motion ceases, the additional mechanical force provided by the fluidizing gas passing through the distributor plate is insufficient to break up the aggregates which form and the bed will not refluidize. These polymers are classified as those, which have a minimum bin opening for free flow at zero storage time of two feet and a minimum bin opening for free flow at storage times of greater than five minutes of 4 to 8 feet or more.

Sticky polymers can also be defined by their bulk flow properties. This is called the Flow Function. On a scale of zero to infinity, the Flow Function of free flowing materials such as dry sand is infinite. The Flow Function of free flowing polymers is about 4 to 10, while the Flow Function of non-free flowing or sticky polymers is about 1 to 3.

Although many variables influence the degree of stickiness of the resin, it is predominantly governed by the temperature and the crystalinity of the resin. Higher temperatures of the resin increase its stickiness while less crystalline product such as very low density polyethylene (VLDPE), ethylene/propylene monomer (EPM), ethylene/propylene diene monomer (EPDM) and polypropylene (PP) copolymers usually display a larger tendency to agglomerate in larger particles.

The mechanical agitation of a fluid bed or stirred gas phase reactor is sufficient to prevent the agglomeration of sticky polymers in the vessel. However current discharge systems utilized with gas phase reactors are not designed to process sticky polymers.

For example, U.S. Pat. No. 4,621,952 issued Nov. 11, 1986 discloses a product discharge system having an operation incompatible with the removal of sticky resins. In this system, the solid polymer is removed intermittently from the reactor into a holding vessel by means of a substantial pressure gradient. The resin particles impact the vessel wall with great momentum leading to the compaction and agglomeration of the sticky polymer. In addition, the depressurization phase necessary for the transfer of the resin to lower pressure process equipment requires a lead time during which the bed is motionless and subject to consolidation in a large chunk.

Another method and apparatus used to remove polymer resins from a fluid bed gas phase reactor is of the type disclosed in Japanese Disclosure number J 58032634-A. The apparatus comprises a long screw feeder connected to the gas phase fluid bed reactor via a feed pipe. The lead of the screw has a decreasing pitch, the purpose of which is to compact the solid polymer and increase its bulk density as the polymer is transported away from the reactor. The effect of the compaction is to increase the resistance of the flow from the high pressure region of the reactor to the low pressure region of the conveying line where the resin is discharged. Unfortunately the compaction of the polymer solid on which the successful operation of the apparatus is based is incompatible with the processing of sticky polymers. During compaction, the sticky polymer sinters in large chunks resulting in the failure of the screw or the blockage of the discharge end.

Another problem associated with the production of sticky polymers is the removal of monomer and volatile residues from the solid polymer. To avoid agglomeration of the particles in the gas phase reactor, a compromise exists between the temperature of the polymerization reaction and the degree of agitation required to maintain the bed in a free-flowing state. The production of sticky polymers requires substantially lower process temperatures in comparison to free flowing resins. The lower temperature of the solid polymer significantly reduces the desorption rates of volatile residues.

Purge bins which are commonly used in conjunction with gas phase reactors are presently unsatisfactory to devolatilize monomer residues of sticky and relatively cold polymers. A purge bin contains a bed of polymer resin slowly moving downward as a plug flow while being swept by an inert gas counter-currently. Compaction of the resin and low degree of inter-particle motion results in the sintering of the entire bed. U.S. Pat. No. 4,372,758 is an example of this process and is incorporated by reference.

Fluid bed purgers provide the necessary agitation of the sticky polymer but are impractical in treating cold solid polymers. The size of the fluid bed purger necessary to provide the required devolatilization time at low polymer temperatures and the amount of inert gas needed to devolatilize the monomer residues are economically prohibitive. Heating the resin is not practical either since higher temperatures would initiate resin particle aggregation leading to the defluidization of the bed.

The deactivation of Ziegler-Natta catalysts and aluminum alkyl cocatalyst residues embedded in the solid polymer is frequently carried out in parallel with the devolatilization process in the purge bin as demonstrated in U.S. Pat. No. 4,731,438 issued Mar. 15, 1988. The deactivating agent of choice is water although other compounds may be substituted. A stream of water vapor is added to the inert purge gas to form a mixture which percolates upward in the resin bed. The water then contacts the resin and neutralizes the catalyst and cocatalyst residues. Volatiles generated from the deactivation reaction are evolved in a manner similar to those dissolved in the solid polymer. However the poor handling properties of sticky resins and the impracticality of using the purge bin as previously discussed poses a problem in carrying out the deactivation of catalyst and cocatalyst residues.

The incorporation of additives in sticky resins is also problematic. Again the poor handling characteristics of the resin do not allow the practice of current methods based on dry blending or on the letdown of a granular masterbatch made of a concentrate of additives in free flowing resins.

Finally, solid polymer transport systems based on dilute phase conveying or dense phase conveying can not be utilized with sticky resins. In the dilute phase system, sticky resin particles tend to adhere to the walls, particularly in bends, leading to the rapid fouling of of the transfer line. The dense phase conveying system is also not suitable for the transport of sticky resins since the large compressive forces acting on the resin particles result in the formation of chunks leading to transfer system failure.

SUMMARY OF THE INVENTION

Broadly contemplated, the present invention provides an apparatus for the post reaction treatment of resins produced by fluidized bed polymerization of alpha olefins comprising in combination a fluidized bed reactor for producing polymer granules, an extruder a portion of which is disposed in said reactor and having an inlet adapted to receive said polymer particles from said reactor in said portion, valve means disposed in said extruder defining an upstream zone from said valve means into said reactor and a downstream zone from said valve means in the direction away from said reactor said valve means being adapted to maintain pressure in said upstream zone independent of pressure in said downstream zone, injection ports disposed in said extruder for introducing additives, stripping agents and catalysts deactivating compound to said extruder, vent ports disposed in said extruder for venting fluids and monomer from said extruder, and a discharge outlet for discharging polymer product from said extruder.

The present invention also provides a process for the post reaction treatment of resins produced by fluidized bed polymerization of alpha olefins which comprises:

(a) providing a screw extruder in communicating contact with said fluidized bed said screw extruder being adapted to receive polymer particle resins from said fluidized bed (b) removing polymerized product resin from said fluidized bed by the action of said screw extruder in communication with said fluidized bed.

(c) melting said resin in said extruder to form molten polymer (d) effecting a seal with said molten polymer in said extruder to provide an upstream zone from said seal into said reactor and a downstream zone from said seal in a direction away from said reactor, said seal isolating the pressure in said upstream zone from said downstream zone, (e) devolatilizing monomer residues and volatiles dissolved in said polymer melt by venting said monomer residues and volatiles from said extruder, (f) deactivating catalyst and cocatalyst residues by introducing a deactivating agent to said extruder, (g) adding additives in the absence of oxygen to said extruder containing said polymer melt; steps (e) through (g) being conducted in said downstream zone and (h) discharging treated polymer product from said extruder.

DETAILED DESCRIPTION OF THE INVENTION

The fluidized bed reactor can be the one described in U.S. Pat. No. 4,482,687 or another conventional reactor for the gas phase production of, for example, polyethylene or ethylene copolymers and terpolymers. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. The fluidizing gas can also be a halogen or sulfur dioxide or other reactive gas. A typical cycle gas is comprised of ethylene, nitrogen, hydrogen, and propylene, butene, or hexene monomers, either alone or in combination.

Examples of sticky polymers, which can be produced by subject process include ethylene/propylene rubbers and ethylene/propylene diene termonomer rubbers, polybutadiene rubbers, high ethylene content propylene/ethylene block copolymers, poly (1-butene) (when produced under certain reaction conditions), very low density (low modulus) polyethylenes i.e., ethylene butene rubbers or hexene containing terpolymers, and ethylene/propylene/ethylidenenorbornene terpolymers of low density. The process can also be used for chlorination or chlorosulfonation, and propylene chlorination or chlorosulfonation, and propylene systems. In the chlorination and chlorosulfonation processes, the polymer passes through a sticky phase rather than being inherently sticky.

Subject process can be carried out in a batch or continuous mode, the latter being preferred.

Characteristic of two types of resins which can be produced in subject process are as follows:

One type of resin is an ethylene/propylene rubber containing 25 to 50 percent, by weight, propylene. This material is sticky to the touch at reactor temperatures of 20° C. to 40° C. and has a severe tendency to agglomerate when allowed to settle for periods of more than two to five minutes. Another sticky resin is an ethylene/butene copolymer produced at reactor temperatures of 50° C. to 80° C. at density levels of 880 to 905 kilograms per cubic meter and melt index levels of 1 to 20 and chlorinated or chlorosulfonated after being produced in the fluidized bed reactor.

Figure 1:
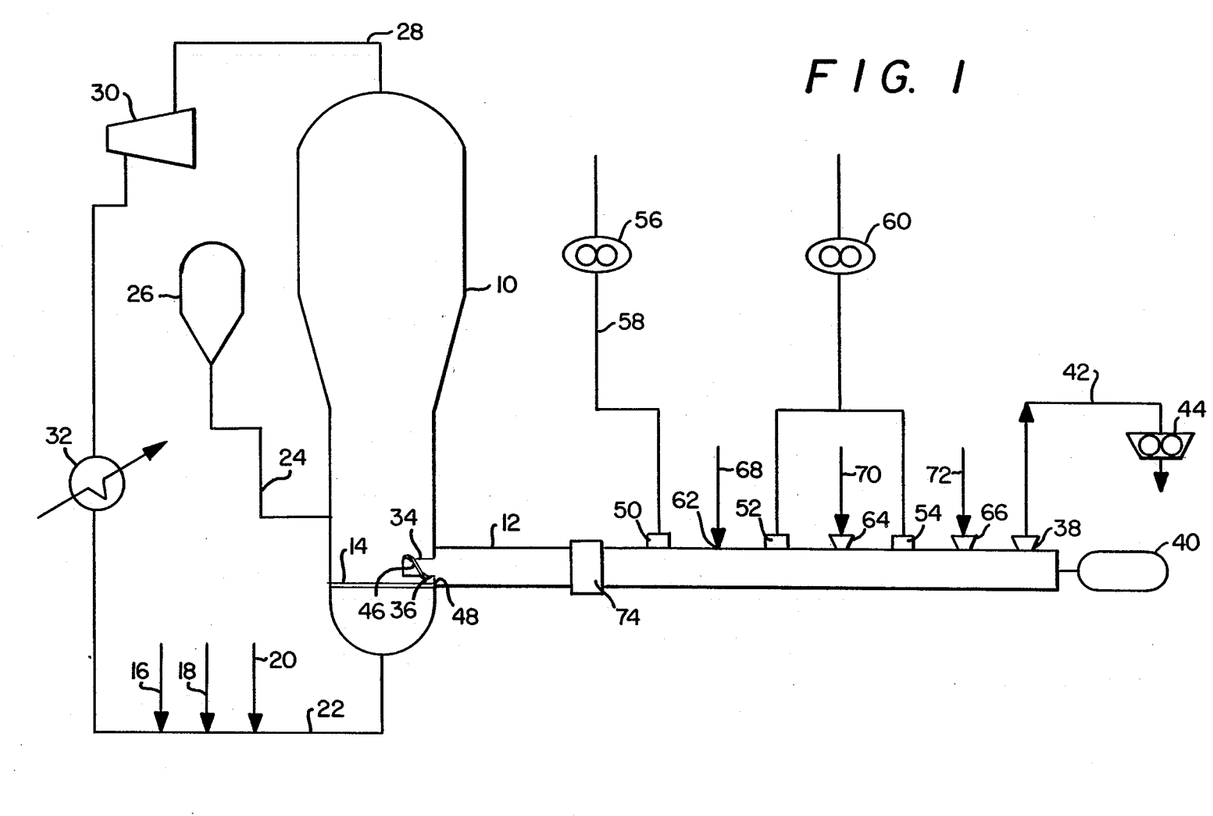
FIG. 1 illustrates an embodiment of the invention where a vented extruder is coupled directly to a reactor with a feed port positioned directly above the distributor plate of the reactor.

For a better understanding of the invention, and to show how the same may be carried into effect, reference is made by way of example to the drawing and particularly FIG. 1 which shows fluid bed reactor 10 directly coupled to extruder 12. Reactor 10 is provided with a conventional distributor plate 14 disposed slightly below extruder 12. Cocatalyst, monomer and comonomers are introduced into reactor 10, through lines 16, 18 and 20 respectively through lines 22 and into reactor 10, and catalyst is introduced through line 24 from catalyst feeder 26. Recycle gas is discharged from reactor 10, through line 28 and passes through compressor 30, cooler 32 and joins the feeds entering line 22 from lines 16, 18 and 20.

The preferred type of extruder is a twin screw extruder although a single screw extruder is also operable. The twin screw extruder is commercially available from a variety of sources such as Werner Pfleiderer Corp., Berstorff Corp. and Welding Engineers and provides excellent devolatilization performance and mixing characteristics.

There are many acceptable ways to connect the cavity of extruder 12 with reactor 10. Direct coupling can be achieved by having the screw 34 of the extruder protruding partly inside the fluid bed as shown in FIG. 1. In this configuration, the commercial extruder is modified so that the normal rotation of the screw is reversed. The extruder is further modified in that the discharge end conventionally associated with the extruder becomes its inlet end and the inlet end becomes the discharge end. Thus in the drawing reference numeral 36 illustrates the inlet end and 38 the outlet or discharge end. The drive train 40 of extruder 12 can be located away from the extruder near discharge end 38 where the polymer melt changes direction by means of a 90° elbow (not shown) before being fed through line 42 to melt pump 44. Line 42 represents a heated conduit to maintain polymer melt in the molten state. The resin throughput is controlled by the screw rotational speed. It is also regulated by the lead of the screw element located in the fluid bed and extruder interface. For example, a reduction in the extruder throughput can be achieved by reducing the lead 46 at the reactor wall 48.

The length of the extruder is determined from a compromise between the necessity of accomplishing all the tasks required for a complete post reaction treatment of the resin and the need to limit the energy input to the polymer. The minimum length of the extruder is usually set by the devolatilization requirements of the product. Heavy residue monomers such as ethylidenenorbornene dissolved in EPDM resins are difficult to remove and require a longer residence time of the resin in the extruder.

Extruder 12 is also provided with three vents represented by reference numerals 50, 52, and 54.

Vent 50 is in vacuum communication with vacuum pump 56 through line 58. In similar manner, vents 52 and 54 are in vacuum communication with vacuum pump 60. Vacuum pumps 56 and 60 are conventional and commercially available in the art. They are designed to provide vacuum of from about 200 millimeters of mercury to about a few millimeters of mercury.

Extruder 12 is also provided with injection ports for introducing additives to the extruder. Thus injection ports 62, 64, and 66 are disposed in the extruder in a manner such that port 62 receives a catalyst deactivating agent such as water through line 68 for deactivating catalyst and foaming the polymer melt to improve devolatilization efficiency. Port 64 receives necessary additives through line 70 and port 66 receives any optional additives through line 72. It is to be understood however that port 64 can also be utilized to receive water or stripping agents in which case additives would then be introduced solely through port 66.

The location of vents 50, 52 and 54 are such as to define vent stages or zones corresponding to a first vent stage or zone for vent 50, a second stage or zone for vent 52 and a third stage or zone for vent 54. Each stage or zone is isolated from one another by molten polymer seals. In co-rotating intermeshing twin screw extruder, molten polymer seals between each zone can be effected by compression of the resin polymer melt utilizing a combination of decreasing pitch and reverse pitch segments of the extruder screws as is known in the art. Cylindrical inserts critically located on the extruder screws of counter-rotating non-intermeshing extruders are also known to provide efficient polymer melt seals.

An important aspect of the invention is that a seal with the molten polymer in the extruder must be established in order to separate the pressure from the seal into the reactor from the pressure from the seal in a direction away from the reactor. This can be accomplished in a variety of ways and would depend primarily on the type of extruder utilized. For example, in a co-rotating intermeshing twin screw extruder, one technique is to use reverse screw elements to provide the variant pressures to effect the seal of the molten polymer. Referring again to FIG. 1 of the drawing the seal represented by reference numeral 74 is generally effected prior to vent 50 so as to provide an upstream zone running from the seal into the reactor, and a downstream zone running from the seal towards the discharge end 38.

The pressurized chamber of the fluidized bed reactor 10 is isolated from the vacuum applied at the first vent stage of extruder 12 by means of the sealing action of the molten polymer. In a counter rotating non-intermeshing twin screw extruder, the seal is created by restricting the cross section available for the polymer flow. The restriction can be effected by cylindrical elements (not shown) mounted side by side on each screw shaft. The clearance of these cylindrical elements with the extruder barrel and the viscosity of the molten polymer determine the pressure generated in that zone. In general, the clearance is chosen so as to create a pressure equal to twice the reactor pressure. In a co-rotating intermeshing twin screw extruder the high pressure of the sealing zone is obtained with the use of reverse screw elements which actively increase the resistance to the melt flow. Although designed for intermeshing applications, a valve such as described in German Pat. No. DE 30 42 427 having twelve throttle pins in the transverse plane to vary the flow cross section can also be used to generate the high pressure zone in the resin melt.

The preferred method to effect the molten polymer seal is to utilize an automatic valve of the type disclosed in copending application Ser. No. 213,096 filed concurrently herewith and assigned to a common assignee, and which is now abandoned. The valve disclosed therein maintains a constant pressure in the melt seal zone regardless of the extruder screw speed and polymer melt viscosity. This is achieved by controlling the cross-section available for the flow of the molten polymer via the melt seal pressure feedback on the valve servo-mechanism. The range of operability is greatly extended by the use of this device.

Figure 4:
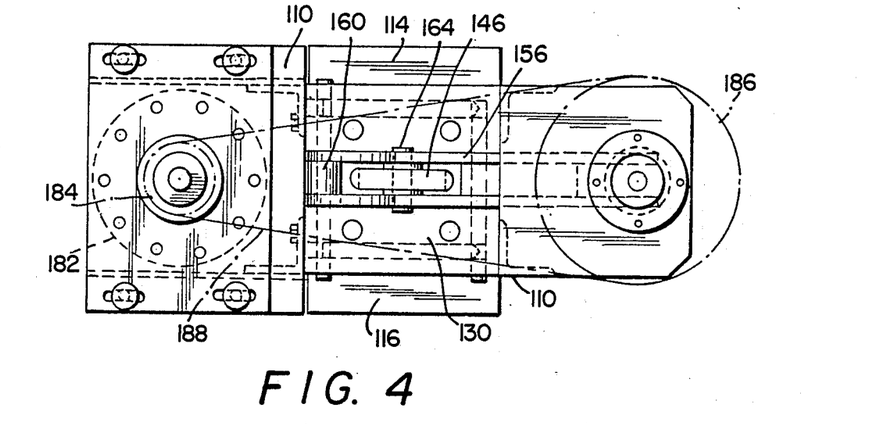
FIG. 4 is a plan view of an apparatus accommodating the valve means.
Figure 5:
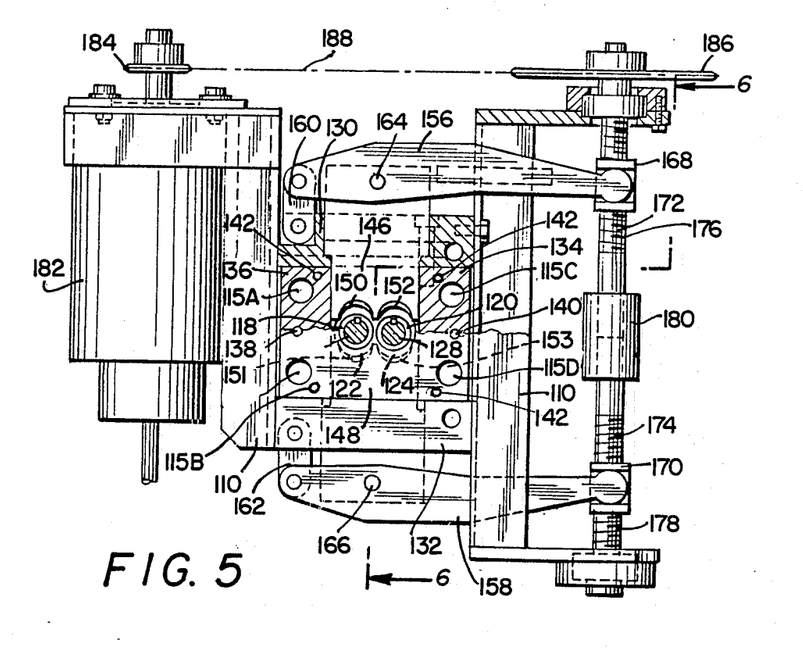
FIG. 5 is a side elevation, partly in section of the valve means of the invention.
Figure 6:
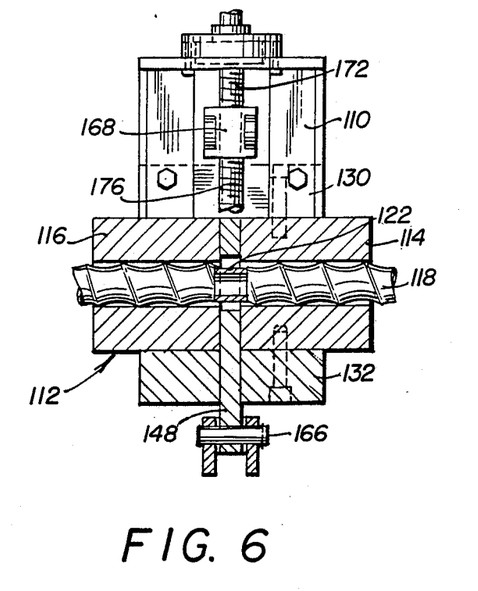
FIG. 6 is a view taken along the line 6—6 of FIG. 5.

The preferred valve means is indicated in FIGS. 4, 5, and 6 of the drawing. Thus referring to FIGS. 4, 5, and 6 the apparatus which accommodates the valve means includes a frame 110, which is secured to a twin extruder 112. Extruder 112, includes a conventional inlet and outlet and barrel sections 114 and 116 which are held together by means of four tie rods extending through openings 115A, 115B, 115C and 115D. Positioned within the barrel sections 114 and 116 are two extruder screws 118 and 120 which are slightly modified to include flightless cylindrical elements 122 and 124 inserted in the screw shafts 126 and 128 respectively. Thus each of the screws 118 and 120 has a segment along its length which defines a smooth circumferential surface.

Secured upon the upper surface of extruder 112 is upper guide plate 130 with a corresponding lower guide plate 132 being secured on the lower surface of extruder 112. As can be seen from FIGS. 5 and 6 frame 110 is secured to upper guide plate 130 and lower guide plate 132. Guide plates 130 and 132 are provided with slots or openings which lead through the opening in barrel sections 114 and 116 to the cylindrical elements 122 and 124.

The opening in barrel sections 114 and 116 is provided by spacers 134 and 136 which are positioned between adjacent barrel sections 114 and 116. Dowels 138 and 140 insure the proper alignment of barrel sections 114 and 116 while spacers 134 and 136 are aligned by means of dowels 142.

Referring to FIG. 4, it will be seen that the openings in barrel sections 114 and 116 accommodate oppositely disposed gate members or blades 146 and 148. Blades 146 and 148 are constructed and arranged so as to move in synchronous motion towards or away from cylindrical elements 122 and 124 of extruder screws 118 and 120, respectively.

As best seen from FIG. 5, blades 146 and 148 are basically flat and are provided with ends which define semicircular configurations 150 and 152 on upper blade 146 and 151 and 153 on lower blade 148. Thus the edges of blades 146 and 148 each have two half circles milled out side by side. When the blades are in their fully closed position, i.e., when the semicircular ends 150, 151, 152 and similarly 153 encircle cylindrical elements 122 and 124 the blades leave two openings of a diameter essentially equal to the diameter of the cylindrical elements 122 and 124.

Blades 146 and 148 are constructed and arranged so as to be capable of moving towards or away from each other in the plane perpendicular to the longitudinal axis of screws 118 and 120.

The gate members or blades 146 and 148 define an upstream zone leading from blades 146 and 148 to the inlet of said extruder 112 and a downstream zone leading from blades 146 and 148 to the outlet of extruder 112.

The position of the gate member with respect to the extruder screws is controlled by gate regulating means which are responsive to pressure in the upstream zone of the extruder. In general, the gate regulating means include a mechanical arrangement of links and levers which is symmetrical with respect to the plane common to the longitudinal axis of extruder screws 118 and 120.

Thus referring to FIG. 5, the gate regulating means include a pair of oppositely disposed actuating levers 156 and 158 each having one end pivotably connected to anchor links 160, 162. Anchor links 160 and 162 are in turn pivotably connected to guide blocks 130 and 132. Blades 146 and 148 are secured to actuating levers 156 and 158 by means of pins 164 and 166. respectively so that when actuating levers 156 and 158 are urged towards or away from each other, blades 146 and 148 are also synchronously urged towards or away from each other.

The other ends of actuating levers 156 and 158 are pivotably mounted in Jack screw nuts 168 and 170. As will be seen from FIG. 5, Jack screw nuts 168 and 170 threadably engage Jack screw 172 and 174. Each of the Jack screws have oppositely disposed threads 176 and 178 i.e., left hand and right hand threads. Jack screws 172 and 174 are coupled by means of coupler 180.

Thus when Jack screw 172 and 174 is rotated it in turn causes Jack screw nuts 168 and 170 to move in opposite direction from each other. Provision for rotating Jack screw 172 and 174 is made by means of servo motor 182 which is in communication with Jack screws 172 and 174 such that when the motor is energized it likewise causes rotational movement to Jack screws 172 and 174 through sprockets 184 and 186 linked by drive 188. Servo motor 182 is electrically connected to a conventional pressure sensing means e.g., a pressure transducer in contact with the molten polymer located in the upstream section or zone of extruder 112. Thus according to the invention, the sensed pressure in the upstream gas is compared to a pre-set valve, the differences of which determines the relative rotation of the servo motor. In other words, the pressure transducer (not shown) feeds back a signal to servo-motor to ultimately adjust the relative position of blades 146 and 148.

In a typical mode of operation and commencing with the blades 146 and 148 in the position shown in FIG. 5, if the pressure sensor indicates that the blades should be urged towards each other to increase the pressure upstream of extruder 112, thus a signal is sent to servo-motor 182. This is turn causes the servo-motor to increase its rotational speed and through sprockets 184 and 185 and drive chain 188 to cause rotation of Jack screw 172 and 174. Jack screw nuts 168 and 170 ride along the threaded portions 176 and 178 towards each other causing actuating levers 156 and 158 to also be urged towards each other.

Blades 146 and 148 are therefore urged towards each other through the mechanical arrangements of anchor links 160 and 162. The semi-circular portions of blades 146 and 148 decreases the gap between cylindrical elements 122 and 124 and semicircular configurations 150, 151, 152, 153 causing pressure to increase in the melt located in the upstream zone.

In this manner, the reverse procedure would cause the blades to be urged away from each other thereby decreasing the pressure upstream in the extruder.

As mentioned previously, extruder 12 is preferably equipped with three vented stages defined by vents 50, 52 and 54 and which are maintained under vacuum to remove efficiently monomers dissolved in the polymer melt. Devolatilization in the first stage is effected without the aid of stripping agents. The benefits associated with the use of a stripping agent are to foam the polymer melt to increase the surface area available for the diffusion of monomer residues and to lower the partial vapor pressure in the cavity of the vented stage in order to increase the driving forces controlling the desorption process.

In practicing the method of the present invention, foaming in the first stage (defined by vent 50) occurs naturally because of the relatively large amount of dissolved monomers contained in the resin. Foaming is also enhanced by the entrainment of interstitial gas having the composition of the cycle gas with the resin particles. The entrained gas is trapped as the solid polymer is molten in the extruder and forms micro bubbles which expands when exposed to the low pressure level of the first devolatilization stage.

An advantage of not using a stripping agent in the first stage is that it is possible to recycle the vent effluent directly to the reactor through the intermediary of a compression step. Since approximately 98% of all monomer residues are recovered in the first stage, a significant economy is realized on the size of the separation unit. Thus, the gaseous effluent leaves vent 50 through line 58 and is re-introduced into reactor 10.

The amount of volatiles remaining in the polymer melt after the first stage are low. To increase the devolatilization efficiency, a stripping agent is injected in the molten polymer through line 68. The preferred agent is water although other compounds such as isopropyl alcohol have proven to be effective in enhancing the devolatilization rate of monomer residues. Water is also preferred because it deactivates catalyst and cocatalyst residues contained in the polymer melt. Deactivation of the catalyst and cocatalysts residues are a necessary step before attempting to incorporate additives in the resin melt aimed at stabilizing the product or modifying the properties.

The second devolatilization stage defined by vent 52 is isolated from the first by means of a melt seal in a manner similar to the one described for isolating the pressurized reactor. However, the requirements regarding the pressure level are of a lesser degree. Nevertheless, the molten seal should extend over injection port 62 to ensure good incorporation in the resin melt and avoid contamination of vent 50. The vent effluent of the second stage is directed to a separation unit (not shown) where water is removed from the monomer residues and reused as a stripping agent. Water is added to the close loop system to account for losses due to the hydrolysis of the catalysts and cocatalysts residues.

A third devolatilization stage defined by vent 54 is provided to reduce the monomer residues to the desired level in accord with the safety requirement of the product and the environmental regulations. Isolation of the third stage from the second stage is necessary if a stripping agent is needed to complete the devolatilization process.

Resins additives are incorporated through line 70 to the molten polymer preferably at a location between the second stage and the third stage when the injection of a stripping agent is not necessary. Otherwise, the mixing of the additives is carried out after the third vent through line 72. Liquid additives are continuously injected as a side stream in a region of intense mixing of the molten polymer. Similarly solid additives are incorporated in the molten polymer stream by means of a feeder in the absence of oxygen and under an inert atmosphere.

The additives which can be utilized in the invention are conventional in the art. Merely as illustrative, the following additives can be employed: tetrakis [methylene (3,5-di-tert-butyl-4-hydroxy-hydrocinnamate)]methane (Irganox 1010) available from Ciba Giegy Corporation, Hawthorne, N.Y.; tris (2,4-di-tert-butylphenyl) phosphite (Irgafos 168) available from Ciba Geigy Corporation, Hawthorne, N.Y. and zinc oxide.

Figure 2:
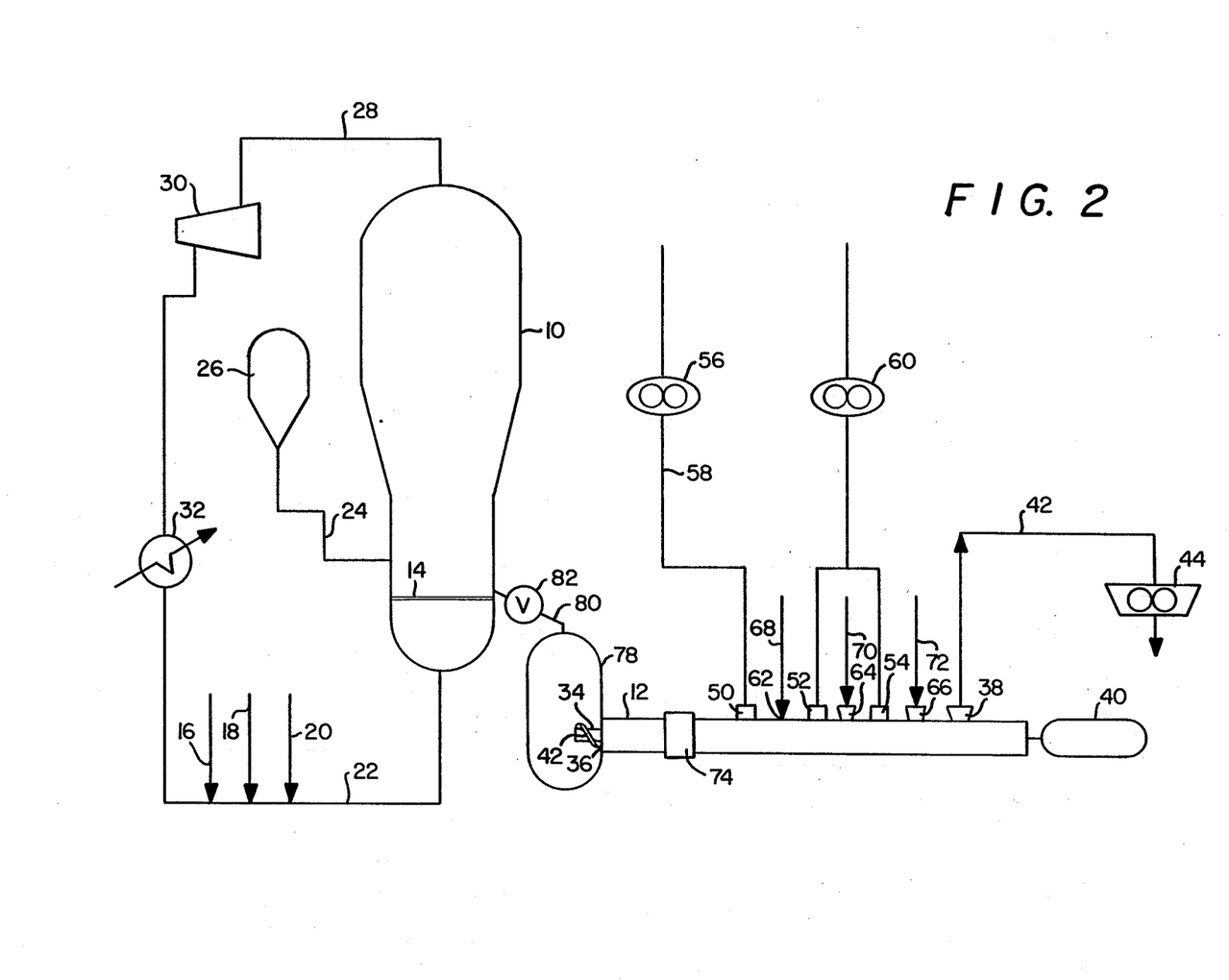
FIG. 2 is another embodiment of the invention wherein a transfer vessel is disposed between the reactor and the vented extruder.

FIG. 2 is another embodiment of the invention wherein a transfer vessel is disposed between the reactor and the vented extruder. Thus, referring to FIG. 2 wherein like parts are designated by like reference numerals, transfer vessel 78, is shown as being disposed between reactor 10 and extruder 12. Vessel 78 is connected to reactor 10 by means of pipe 80 equipped with ball valve 82 which purpose is to provide a positive isolation of the pressurized chamber of reactor 10 when needed. Vessel 78 which is maintained at the pressure of reactor 10, receives resin from reactor 10 by gravity. The volume of vessel 78 is desirably kept small to permit a short residence time of the resin in vessel 78 in order to avoid particle aggregation and the ensuing pluggage of the vessel. The connection of the extruder 12 to transfer vessel 78 can be similar to the connection illustrated in FIG. 1 where the end portion of the screws protrudes inside the vessel. A variation of this approach is the use of a rotary feeder or screw feeder located at the bottom of the transfer vessel to meter the resin feed in the extruder. The extruder can be operated as before or reverted to its standard configuration.

Figure 3:
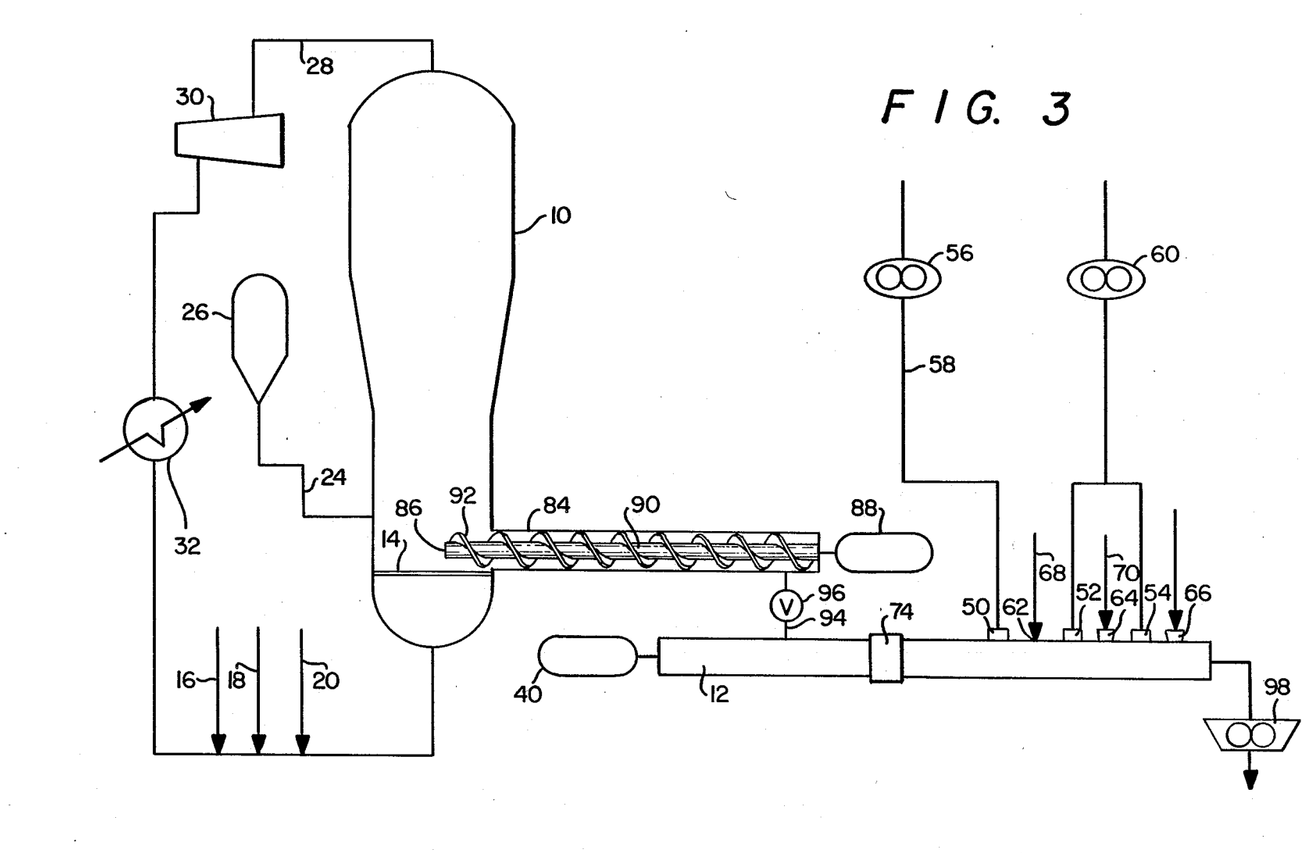
FIG. 3 illustrates a further embodiment of the invention wherein a screw feeder is disposed between the vented extruder and the reactor.

FIG. 3 illustrates still another embodiment of the invention wherein a screw feeder is disposed between the vented extruder and the reactor. Thus, referring to FIG. 3 wherein like parts are designated by like reference numerals, a conventional screw feeder 84 having an end 86 in contact with the fluidized bed is disposed between reactor 10 and extruder 12 in closed system communication with reactor 10 and extruder 12. Screw feeder 84 is driven by motor 88 which drives screw 90. The lead 92 of screw 90 at the fluid bed interface is selected so as to maintain screw 90 in a partly filled condition in order to avoid resin compaction. Screw 90 is operated at a rate such that the removal rate of the resin is substantially equal to the reactor production rate. Resin is discharged from screw feeder 84 through pipe 94 which supports a ball valve 96 which isolates, when necessary, all equipment under pressure located upstream of extruder 12.

Upon entering extruder 12, the process follows the same procedure as indicated in connection with FIG. 1 except that the treated resin optionally passes through melt pump 98 positioned at the discharge end of extruder 12.

The following examples illustrate the present invention:

EXAMPLE

The polymer treated according to the method of the invention is an ethylene propylene diene monomer product also referred to as EPDM. The EPDM product has a density of 0.876 g/cc, a melt index of 0.43 dg/min and a melt flow ratio of 38.5. The amount of propylene in percent by weight is 33.2. The diene monomer is ethylidenenorbornene or in short ENB present in an amount equal to 3.4 percent by weight of solid polymer. The product has a titanium residue of 23.3 part per million by weight of solid polymer. At room temperature this product is sticky to the touch and agglomerates readily when pressed in the palm of the hand. Left undisturbed in a container for a few minutes, the granules sinter together under the compaction forces of their own weight.

The monomers ethylene and propylene are polymerized in a fluidized bed with a conventional titanium based catalyst. Ethylene and propylene enters the reactor as gases while aluminum alkyl cocatalyst and ENB are sprayed into the reactor cycle gas line and entrained as liquid droplets. The process conditions maintained throughout the production of the EPDM resin are as follows

| Reactor Conditions | |
|---|---|
| Temperature | 30° C. |
| Pressure | 300 psig |
| $C_2H_4$ concentration | 45.8 psia |
| $C_3/C_2$ mol ratio | 2.49 |
| $H_2/C_2$ mol ratio | .056 |
| Ethylenenorbornene feed by weight of resin throughput | 5.5% |
| Cycle gas velocity | 2.2 ft/sec |
| Space time yield | 1.5 pound/hr/ft$^3$ |
| Cocatalyst concentration | 1789 ppm by weight |
| Residence time | 7.6 hours |

The fluidized bed is mainly solid EPDM granules which are maintained in a free flowing state by the mechanical agitation imparted to the bed by the excess fluidization gas flow. The temperature maintained in the fluidized bed is a compromise between the necessity of keeping the granules below their sticking point set in part by the degree of agitation in the fluidized bed and the benefit of operating at a higher temperature to improve the catalyst productivity.

A single screw feeder with a shell and a mechanical seal modified to withstand the 300 psig pressure of the reactor chamber is connected to the reactor vessel. The screw tip slightly protrudes inside the fluidized bed in the vicinity of the gas distributor plate. At steady state, the angular speed of the screw is adjusted to maintain a constant height of the fluidized bed in the reactor. The screw lead at the feeder-reactor interface is carefully chosen to ensure partial filling of the screw flight in order to avoid compaction and sintering of the EPDM granules.

The granules are discharged into the feed section of a counter rotating non-intermeshing twin screw extruder. The feed capacity of the extruder is sufficient to avoid a backup of resin into the pipe connecting the discharge end of the screw feeder and the inlet of the extruder. The pressure at the extruder inlet is the same as the reactor pressure.

In the extruder, the granular resin is rapidly melted and compressed to effect the sealing action of the molten polymer. Cylindrical inserts preferably the valve as described in copending application Ser. No. 213,096 are used to restrict the flow cross-section and increase the pressure in the molten polymer to 700 psig. The seal is reliable in isolating the high pressure level of the reactor and the screw feeder from the low pressure level found downstream of the sealing zone.

Following the compression step in the melt seal zone the resin displays intense foaming characteristics in the first vented stage which is maintained under a vacuum of 100 mm of Hg. To account for the expansion of the resin melt and promote the polymer surface exposure to the low vacuum, a deep channel screw profile is used over a length equivalent to 14 screw diameters.

The screw profile includes a second compression zone following the first stage. Water is injected at a rate of 3% by weight of the resin throughput and mixed into the polymer melt slightly downstream of the pressure peak of the compression zone before entering the second vented stage. The vacuum maintained on the second stage is 5 mm of Hg. Water deactivates the catalyst and cocatalyst residues and acts as a foaming agent of the resin to enhance devolatilization of the remaining monomer residues.

At the exit of the second stage, the resin is recompressed for the purpose of isolating the upstream portion of the extruder and depressurized again in a zone where dry additives are fed into the extruder under an inert atmosphere and mixed with the molten polymer. The additives package consist of zinc oxide, Irganox 1010 and Irgafos 168.

The stabilized resin is passed through a third vented stage kept under a vacuum of 5 mm of Hg to reduce further the concentration of monomer residues dissolved in the resin.

After the third vented stage, the resin is intensively mixed once more, pumped and extruded through a die. The resulting strands are cooled in a water bath and diced into pellets.

A summary of the monomer residues in the polymer melt at the various stages of the process are as follows:

| Monomer Residues Dissolved in Resin | |
|---|---|
| | Residues in ppmw |
| Reactor exit/extruder inlet: | |
| Ethylene | 2,865 |
| Propylene | 69,652 |
| ENB | 21,000 |
| First vented stage exit: | |
| Ethylene | traces |
| Propylene | 2,786 |
| ENB | 1,750 |
| Second vented stage exit: | |
| Ethylene | traces |
| Propylene | 175 |

| Monomer Residues Dissolved in Resin | |
|---|---|
| | Residues in ppmw |
| ENB | 219 |
| Third vented stage exit/ extruder outlet: | |
| Ethylene | traces |
| Propylene | 18 |
| ENB | 44 |

As can be seen from the above, the discharge of solid polymer made of granular produced in a gas phase reactor and having a tendency to aggregate and sinter when left undisturbed is made possible.

In addition, the present invention provides for the elimination of a pressure vessel and associated piping for the transfer of the resin from the high pressure environment of the reactor to the low pressure conditions prevailing in the downstream systems and equipment by using the sealing properties of the molten polymer and the pumping action of the extruder screws to achieve a similar functionality at reduced costs.

Advantageously, the removal of the dissolved monomers from the resin is not only made possible but is done more efficiently and at a great savings in cost.

Moreover, the addition of catalyst deactivation agents followed by the incorporation of stabilization and product enhancement additives to the molten polymer in the absence of oxygen results in a significant cost savings due to the smaller quantities of additives required.

In addition, the mixing process of the additives with the polymer being in a molten state greatly improves their dispersion resulting in an increased efficiency of the added compound.

Finally, the quality control and therefore the consistency of the polymer product is significantly enhanced by the short time required to transform the polymer resin extracted from the reactor into a final product.

What is claimed is:

1. A process for the post reaction treatment of resins produced by fluidized bed polymerization of alpha olefins in a polymerization reactor which comprises:
   (a) providing a screw extruder a portion of which is disposed in said reactor in communicating contact with said fluidized bed said screw extruder being adapted to receive polymer particle resins from said fluidized bed,
   (b) removing polymerized product resin from said fluidized bed by the action of said screw extruder in communication with said fluidized bed,
   (c) melting said resin in said extruder to form molten polymer,
   (d) providing valve means for effecting a seal with said molten polymer in said extruder to provide an upstream zone from said seal into said reactor and a downstream zone from said seal in a direction away from said reactor, said seal isolating the pressure in said upstream zone from said downstream zone,
   (e) devolatilizing monomer residues and volatiles dissolved in said polymer melt by venting said monomer residues and volatiles from said extruder,
   (f) deactivating catalyst and cocatalyst residues by introducing a deactivating agent to said extruder,
   (g) adding additives in the absence of oxygen to said extruder containing said polymer melt; steps (e) through (g) being conducted in said downstream zone and
   (h) discharging treated polymer product from said extruder.

2. A process according to claim 1 wherein said screw extruder is a twin screw extruder.

3. A process according to claim 1 wherein said polymer particle resin is an ethylene/propylene rubber containing 25 to 50 percent propylene by weight.

4. A process according to claim 1 wherein said polymer particle resin is an ethylene/butene copolymer produced at reactor temperatures of 50° C. to 80° C. at density levels of 880 to 805 kilograms per cubic meter and which is chlorinated or chlorosulfonated.

5. A process according to claim 1 wherein in step (d) said seal of molten polymer is obtained by restricting the cross section of said extruder available for polymer flow.

6. A process according to claim 1 wherein in step (e) said monomer residues and volatiles are vented from said extruder under vacuum in a first vent stage.

7. A process according to claim 1 wherein in step (f) said deactivating agent is water.

8. A process according to claim 1 wherein in step (f) said catalyst and cocatalyst residues are deactivated under vacuum in a second vent stage.

9. A process according to claim 1 wherein said additives added in step (g) are tetrakis [methylene (3,5-di-tert-butyl-4-hydroxy-hydrocinnamate)] methane, tris (2,4-di-tert-butylphenyl) phosphite and zinc oxide.

10. A process according to claim 1 wherein a screw feeder is provided between said reactor and said extruder, said screw feeder receiving resin from said reactor.

11. A process according to claim 10 wherein said screw feeder is operated at a rate such that the removal rate of resin from said mixer is substantially equal to the reactor production rate.

12. A process according to claim 10 wherein said screw feeder is disposed in said upstream zone.

* * * * *

UNITED STATES PATENT AND TRADEMARK OFFICE
CERTIFICATE OF CORRECTION

PATENT NO. : 4,958,006

DATED : Sept. 18, 1990

INVENTOR(S) : R.J. Bernier, J.O. Buhler-Vidal; U.S. Haapala; B.R. Rozenblat

It is certified that error appears in the above-identified patent and that said Letters Patent is hereby corrected as shown below:

IN COL. 14

In claim 11, line 3 after "said" delete "mixer" and substitute -- feeder --.

Signed and Sealed this

Twenty-first Day of September, 1993

*Attest:*

BRUCE LEHMAN

*Attesting Officer*  *Commissioner of Patents and Trademarks*